(12) United States Patent
Mattsson

(10) Patent No.: US 6,601,918 B2
(45) Date of Patent: Aug. 5, 2003

(54) ADJUSTABLE VEHICLE SEAT

(75) Inventor: Ingemar Mattsson, Mörrum (SE)

(73) Assignee: Volvo Personvagnar AB (SE)

( * ) Notice: Subject to any disclaimer, the term of this patent is extended or adjusted under 35 U.S.C. 154(b) by 282 days.

(21) Appl. No.: 09/782,689

(22) Filed: Feb. 13, 2001

(65) Prior Publication Data

US 2001/0004164 A1 Jun. 21, 2001

Related U.S. Application Data

(63) Continuation of application No. PCT/SE98/01463, filed on Aug. 13, 1998.

(51) Int. Cl.$^7$ .............................. A47C 7/14; A47C 3/00; B60N 2/68; B60N 2/18
(52) U.S. Cl. ............................. 297/284.11; 297/284.1; 297/410
(58) Field of Search .................. 297/284.11, 284.1, 297/410

(56) References Cited

U.S. PATENT DOCUMENTS

| | | | | |
|---|---|---|---|---|
| 1,304,821 A | * | 5/1919 | Stowasser | |
| 3,635,524 A | * | 1/1972 | Faust | 297/284 |
| 3,749,442 A | * | 7/1973 | Berg et al. | 297/312 |
| 3,802,737 A | * | 4/1974 | Mertens | 297/216 |
| 4,334,709 A | * | 6/1982 | Akiyama et al. | 297/284 |
| 4,401,343 A | * | 8/1983 | Schmidt | 297/284 |
| 4,500,136 A | * | 2/1985 | Murphy et al. | 297/284 |
| 4,589,695 A | * | 5/1986 | Isono | 297/284 |
| 4,637,651 A | * | 1/1987 | Sperr | 297/458 |
| 4,717,203 A | * | 1/1988 | Meiller | 297/312 |
| 4,773,703 A | * | 9/1988 | Krugener et al. | 297/284 |
| 4,883,318 A | * | 11/1989 | Adachi | 297/234 |
| 5,092,655 A | * | 3/1992 | Deegener et al. | 297/459 |
| 5,120,109 A | * | 6/1992 | Rangoni | 297/284 |
| 5,171,062 A | * | 12/1992 | Courtois | 297/340 |
| 5,232,264 A | * | 8/1993 | Hoshihara | 297/344 |
| 5,253,924 A | * | 10/1993 | Glance | 297/452.1 |
| 5,366,272 A | * | 11/1994 | Leburn | 297/284.11 |
| 5,370,444 A | * | 12/1994 | Stulik | 297/284.11 |
| 5,419,614 A | | 5/1995 | Richards et al. | |
| 5,425,569 A | * | 6/1995 | Hayes | 297/452.35 |
| 5,513,897 A | * | 5/1996 | Lemmen | 297/410 |
| 5,547,259 A | * | 8/1996 | Fredrick | 297/452.18 |
| 5,560,681 A | | 10/1996 | Dixon et al. | |

FOREIGN PATENT DOCUMENTS

| | | |
|---|---|---|
| GB | 2 252 723 A | 8/1992 |
| GB | 2252723 A * | 8/1992 |

* cited by examiner

Primary Examiner—Peter M. Cuomo
Assistant Examiner—Joseph Edell
(74) Attorney, Agent, or Firm—Kilpatrick Stockton LLP

(57) ABSTRACT

An adjustable chair for vehicles in which the frame structure is easy to manufacture and includes few components while still providing adjustment in several directions. By adjustment in several directions, it is meant, for example, adjustment of the length of the chair seat, as well as the height of the back of the chair. By manufacturing each frame in one piece with integrated attachments and similar, it is also possible to utilize the same frames for both manually and electrically operated chairs. The chair includes a seat part and a back part each of which have several possibilities for adjustment for individual and ergonomic adaption of the chair; including the aspects of length, height, side support and lumbar support. An operator is provided for adjusting the seat and the back parts, together with components that form parts thereof. The seat and back part are made up of one internal frame each, which includes an edge section that is formed in one piece and a rear section that connects the edge sections, wherein the frame is provided with one or more longitudinally adjustable sections having sinusoidal, waved or trapezoidal cross-sections.

19 Claims, 7 Drawing Sheets

ADJUSTABLE VEHICLE SEAT

RELATED PATENT APPLICATIONS

This is a continuation patent application of International Application Number PCT/SE98/01463 filed Aug. 13, 1998 which designates the United States; the disclosure of that application is expressly incorporated in its entirety.

TECHNICAL FIELD

Car models which are sold in several different markets around the world nowadays need to be modified as regards several details, of which the chairs is one. This is due to, among other things, a varying average size, and alternatively average length of the population in various countries and on the several continents. The present invention relates to a chair having several adjustment possibilities for providing a comfortable and ergonomically correct seating position. For such a chair, possibilities are required for adjustment of the seat, the back, the side supports and the lumbar support of the chair.

BACKGROUND OF THE INVENTION

A chair having a seat which is adjustable in the longitudinal direction is described in U.S. Patent No. 5,370,444, which describes a seat-cushion which is provided with channels which run across the seat between a number of sections. The channels run across the entire width of the seat and from the lower part of the cushion up to a bridge in the upper part of the cushion, which bridge connects adjacent sections. The front section of the cushion rests on a telescopically sliding plate which can be set in relation to the bottom plate of the seat. Thus, the channels between the sections and the bridges which connect adjacent sections provide a certain adjustment of the length of the seat. Drawbacks of this seat include several deep transverse creases which appear in the upholstery in inserted position and an inferior support for load the area which is situated above the channels in most other positions.

U.S. Pat. No. 4,773,703 discloses a similar device in which the sections of the cushion have been situated on a number of individual supporting elements which are reciprocally connected to each other, and are adjustable and lockable in suitable positions. In this regard, the upholstery of the seat is elastically stretched downwards in the space between each element in order not to fold when the seat is adjusted. A drawback regarding this seat is that a bottom plate having several individual elements becomes unnecessarily complicated, and the upholstery must be stretched downwards between the sections.

In U.S. Pat. No. 5,419,614, a mechanism for adjustment of the lumbar support is shown which is in the form of an axle which rotates a cam in the back rest. The axle is fixedly mounted in a frame and has no possibility for vertical adjustment, which is a requirement for an ergonomical adaption.

A side support is disclosed in U.S. Pat. No. 4,883,318 which shows a seat in which the frame has been supplemented with a device for adjustment of the side support in various angles. A drawback associated with this solution is that a comparatively large number of components which are to be built together with the frame, in addition to the adjustment devices, are required for adjustment of the support.

Presently, adjustable chairs are utilized in practically all vehicles, wherein the extent of possible adjustments is widely varying and the solutions to these problems are more or less complicated. A common problem as regards chairs having several adjustment possibilities is that they generally are very complicated and consist of a large number of components, which in turn results in a higher weight. Another problem is that it is necessary for vehicle manufacturers, and alternatively chair manufacturers, to manufacture and stock several different chair sizes, which is due only to the fact that it shall be possible to deliver cars, which are intended for a certain market, with a certain chair size.

SUMMARY OF THE INVENTION

In the present invention, a chair is disclosed in which the frame structure is easy to manufacture and consists of few components, but still provides adjustment in several different directions. In this context, adjustment in several directions is taken to mean, for example, adjustment of the length of the chair seat, as well as the height of the back of the chair. By manufacturing each frame in one single piece with integrated attachments and the like, it is also possible to utilize the same frames for both manually and electrically operated chairs.

Furthermore, by way of this invention, and in order to obtain ergonomic adjustment of the chair to different individuals, it is possible to adjust a plurality of aspects of a chair. Exemplarily, the side supports of the chair are made adjustable for the legs, as well as the back, and the angle between the seat and the back is also made adjustable to customize the height and inclination of the seat. The lumbar support is also configured to be adjustable. It is important that the head of a sitting occupant of the seat be situated in the right position in relation to the head rest in the event of a collision; these various adjustment capabilities are configured with this, and other goals in mind.

Furthermore, in order to obtain a light-weight chair which is ergonomically adjustable to a greater number of individuals than is a standard chair of today's design, the present invention makes it possible to integrate all the above-mentioned functions in a simplified frame made of a plastics material. It is also important to be able to obtain a comfortable and safe driving position, which this chair accommodates. It is also possible to utilize the present chair design in the several different markets around the world thereby decreasing the number of chair sizes which must be manufactured and stocked on a global basis, as well as basis in some markets. In this regard, the number of tools which is required during manufacturer decreases, as well as the stocking space, which results in a more effective production.

The beneficial effects described above apply generally to the exemplary devices, mechanisms and methods disclosed herein for adjustable vehicle seats. The specific structures and methods through which these benefits are delivered will be described in detail hereinbelow.

BRIEF DESCRIPTION OF THE DRAWINGS

The invention will now be described in greater detail in the following way, by example only, and with reference to the attached drawings, in which.

DETAILED DESCRIPTION OF THE INVENTION

As required, detailed descriptions of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1A:
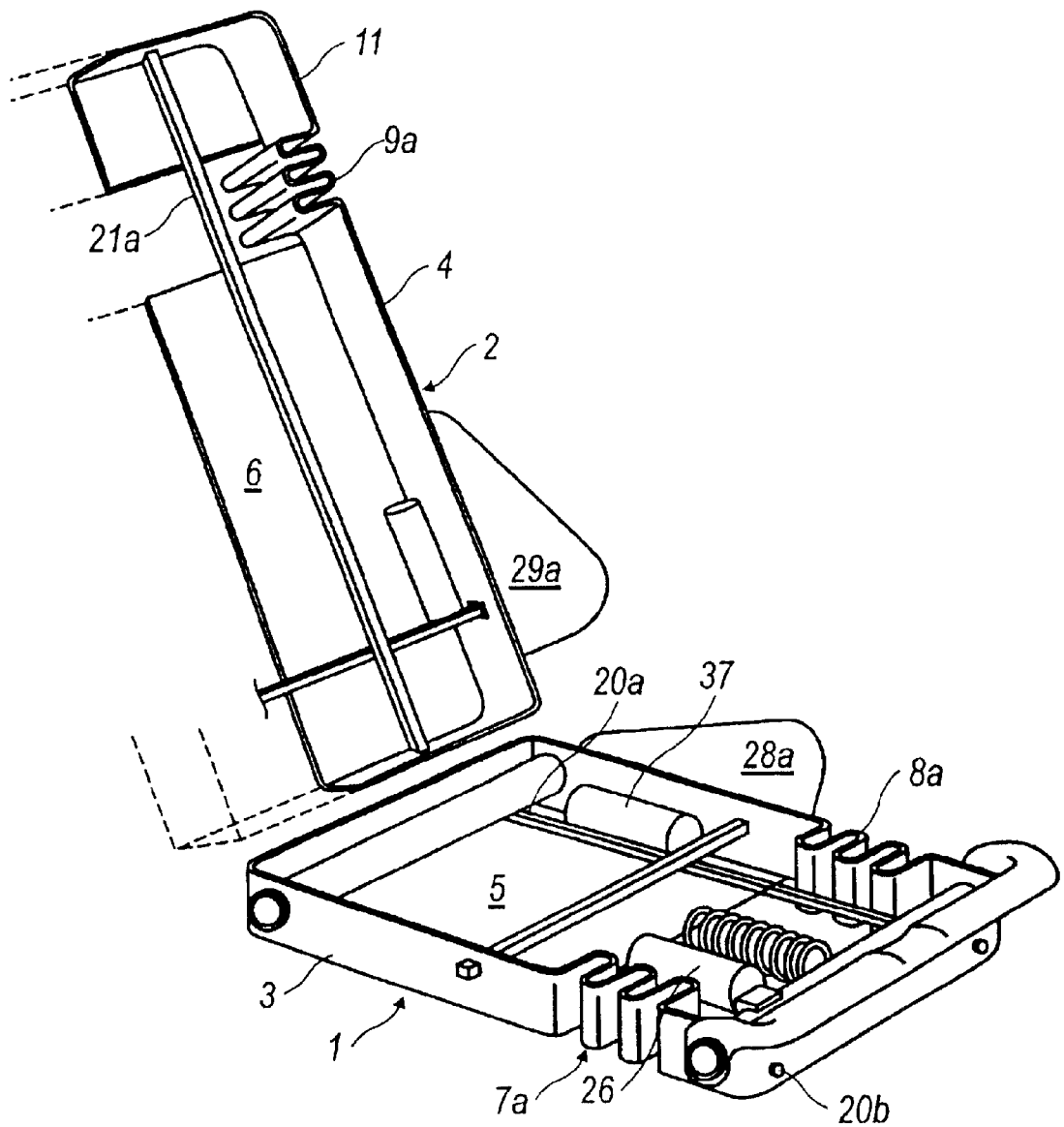
FIG. 1a shows a partial cut-away view of a seat frame and a back frame having sinusoidal cross-sections.

According to a preferred embodiment of the present invention which is shown in FIG. 1a, two separate frame constructions 1, 2, one for the seat-cushion and one for the back cushion, form part of a chair according to the invention. Each frame can be formed in one piece which essentially consists of an external edge section 3, 4 and a rear section 5, 6 which connects the edge sections. The edge sections are essentially situated at right angles to the rear section. The frame is preferably made of an injection molded or cold-extruded polymer or similar material, wherein reinforcements for side collision protections, bearings, operating levers and controls, and attachments for guides, side supports, electric motors and wires can be integrated into the frame.

Figure 1B:
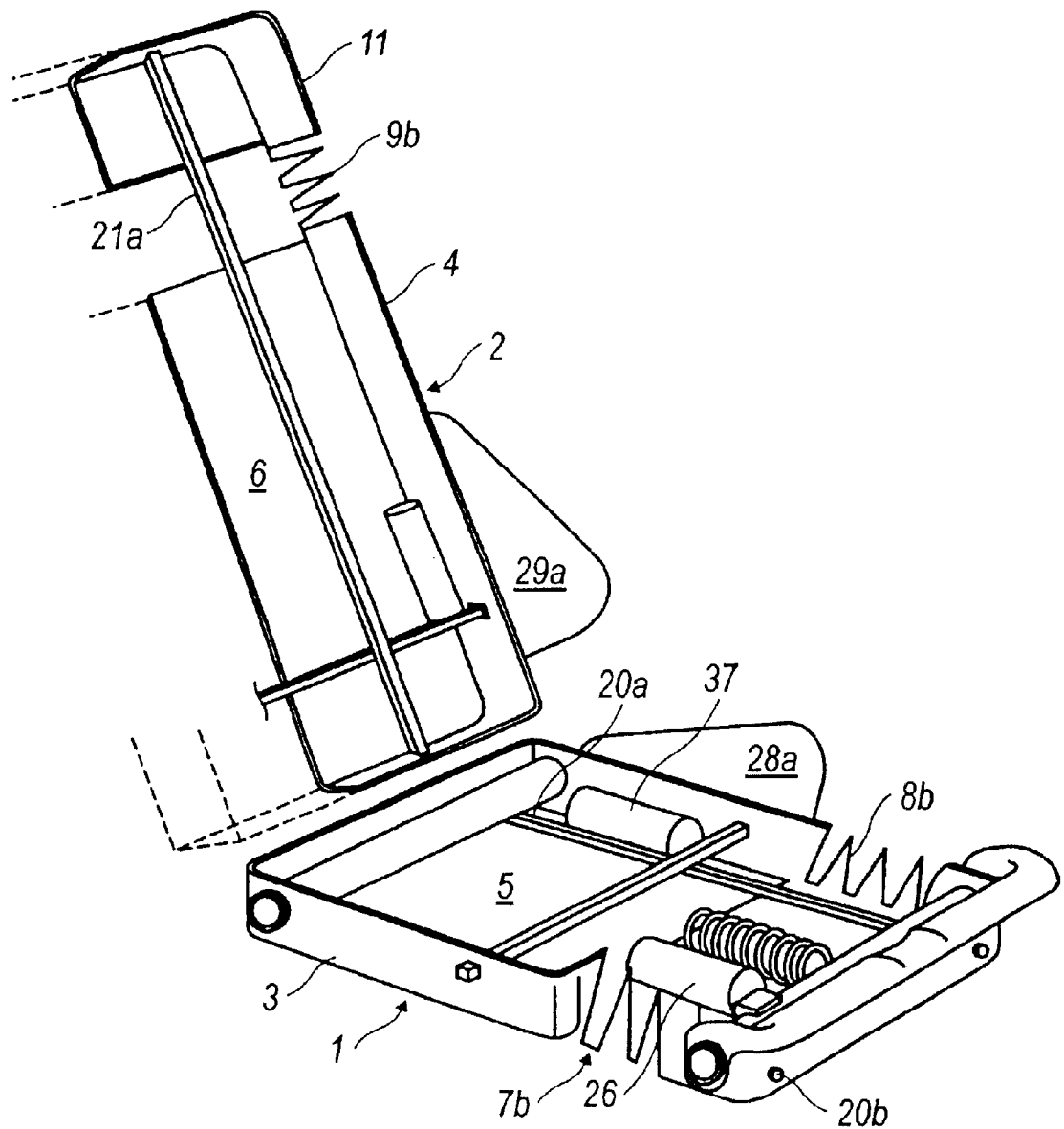
FIG. 1b shows a partial cut-away view of a seat frame and a back frame having trapezoidal cross sections.

In order to provide adjustment of the length of the seat and the height of the back rest, the frames are provided with one or more longitudinally adjustable sections 7a–9a having sinusoidal cross-sections which are elastically resilient. The cross-sections of the sections can also be waved or trapezoidal 7b–9b as illustrated in FIG. 1b.

In this first embodiment, the longitudinally adjustable sections are constituted by the external edge sections of the frame. In order to provide adjustment, the rear section 5, 6 must be terminated where the adjustable sections 7, 8, 9 begin. Alternatively, the rear section 5, 6 may be provided with an interruption 55, 56 corresponding to the extension of the longitudinally adjustable sections 7, 8, 9. An opening or interruption 56 in the rear section 6 provides an intersection at the head rest 11 that results in am improved view rearwards and a weight savings. The longitudinally adjustable sections 7, 8, 9 can have a slightly thinner thickness of material in relation to the rest of the frame and provide adjustment in the longitudinal direction of the frame 1, 2. The longitudinally adjustable part of the frame 1, 2 can be reinforced with an integrated or an external supporting structure (not shown), and can constitute up to one-third of the total length of the frame 1, 2. Of the entire adjustable part, the section with the sinusoidal, waved or trapezoidal cross-section constitutes up to two thirds of the total length of the section. A suitable adjustment area can be +/–30 mm in relation to the unloaded position of the resilient sections.

Figure 2A:
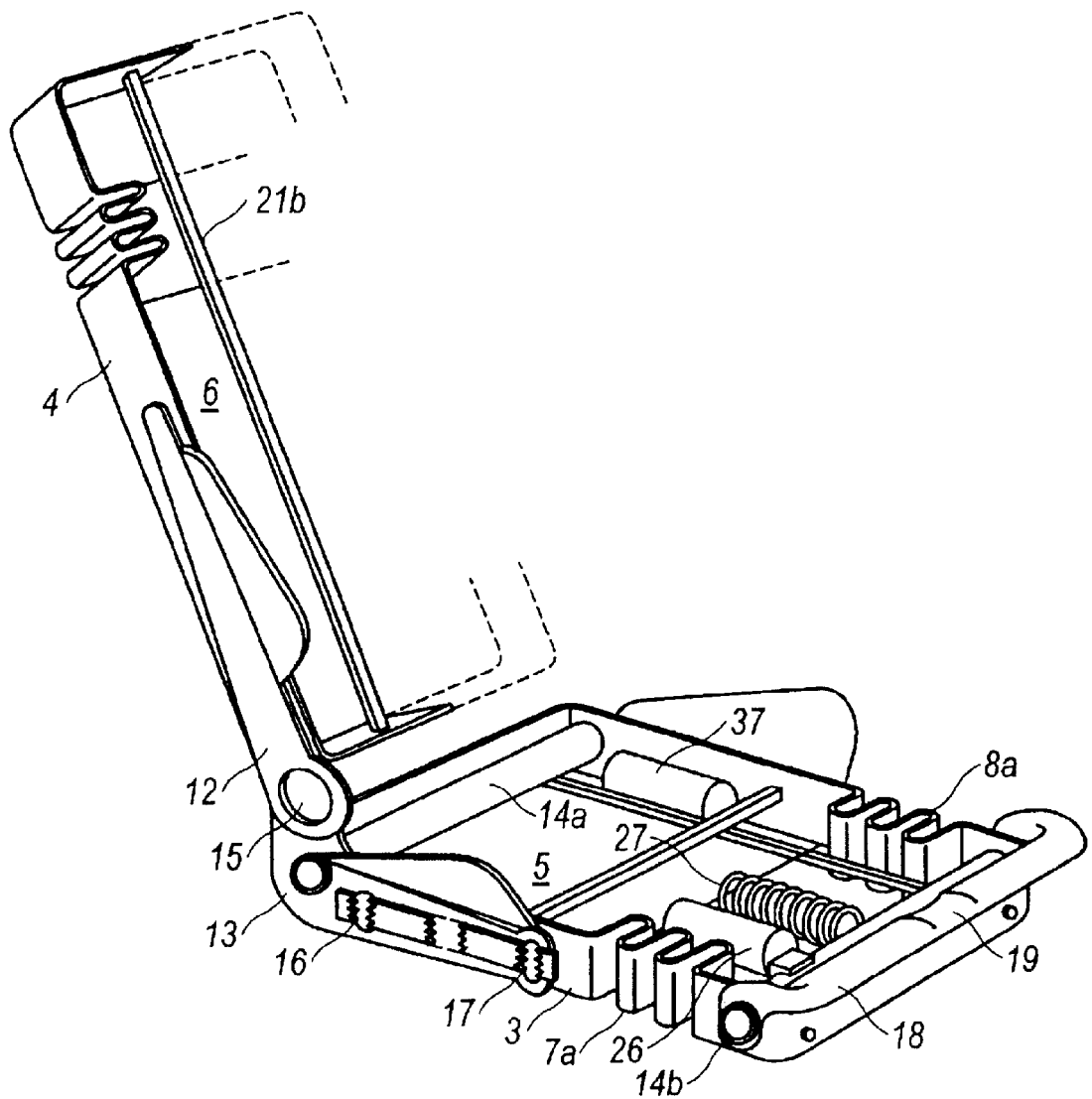
FIG. 2a shows a partial cut-away view of a seat frame and a back frame with reinforcements.
Figure 2B:
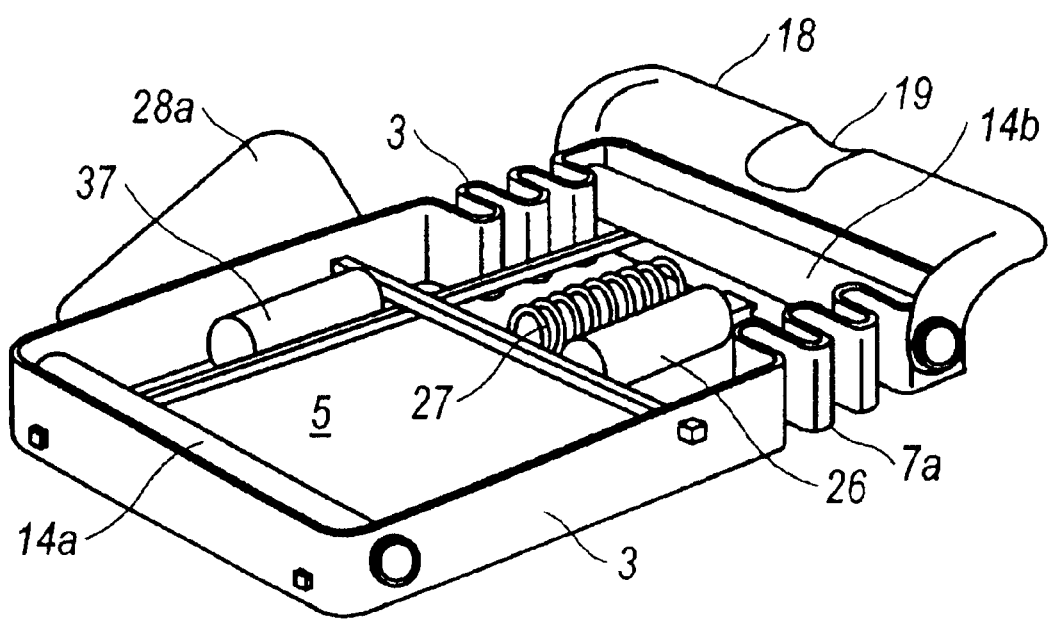
FIG. 2b shows a partial cut-away view of an electrically operated seat frame.

In some cases, it is relevant to reinforce the external side sections of the frame as shown in FIGS. 2a–b, since the plastics per se sometimes lack sufficient strength. Reinforcements 12, 13 may also be required for mounting of components for side collision protections 14a–b, often in the form of transversal tubes, or at a hinge 15 for chairs which are required to be foldable forwards where is shall be possible to adjust the angle between the seat and the back. It is also possible to integrate a transversal tube for side collision protections with the hinge for the angling of the back.

Suitably, the reinforcements 12, 13 of the edge sections are constituted by thin plates in a metallic material; for example, steel or magnesium, and suitably run from a first point where the seat frame and the back frame meet to a second point before the resilient sections begin. Advantageously, the plates can be symmetrical along a longitudinal axle, so that identical plates can be used on both sides of the seat and the back, respectively. The various materials in frames and plates have completely different properties regarding strength. Therefore, it is important to provide a comparatively large area of contact between the parts in order to spread the contact pressure over the largest possible area in the event of, for example, a collision.

The reinforcement plates of the seat can also be provided with two longitudinally separated toothed sections 16, 17 which are directed towards each other separately or in pairs. These toothed sections can be engaged, alternatively disengaged from, and locked in engagement with, corresponding toothed sections (not shown) which are mounted in a sectional chassis which is movable in the longitudinal direction of the car body. The sectional chassis is constituted by a conventional chair underbody and will therefore not be described in more detail. These toothed sections, which can be operated independently of each other, provides adjustment of the height of the seat and the inclination in the front and the rear edge, or so-called "tilt".

The external edge sections 3, 4 of the frame and any possible reinforcement plates 12, 13 are prepared with holes and recesses for controls and attachments for electric motors and other equipment for adjustment of the various parts of the chair. Of course, if that is required, it is possible to arrange similar holes, recesses and attachments in the rear section.

A transversal reinforcement 18 or girder can be arranged in the front section of the seat, on the adjustable part of the frame. This girder is intended to prevent so-called "submarining" in the event of a collision, since it provides the front section of the seat with an increased rigidity. The girder can either be integrated or mounted on the frame and has suitably soft, rounded forms. For certain cases with extreme conditions and very large collision forces, where "submarining" can occur, the girder is provided with a central recess 19 or an interruption in order to avoid injuries to the passenger's genitals.

Figure 3:
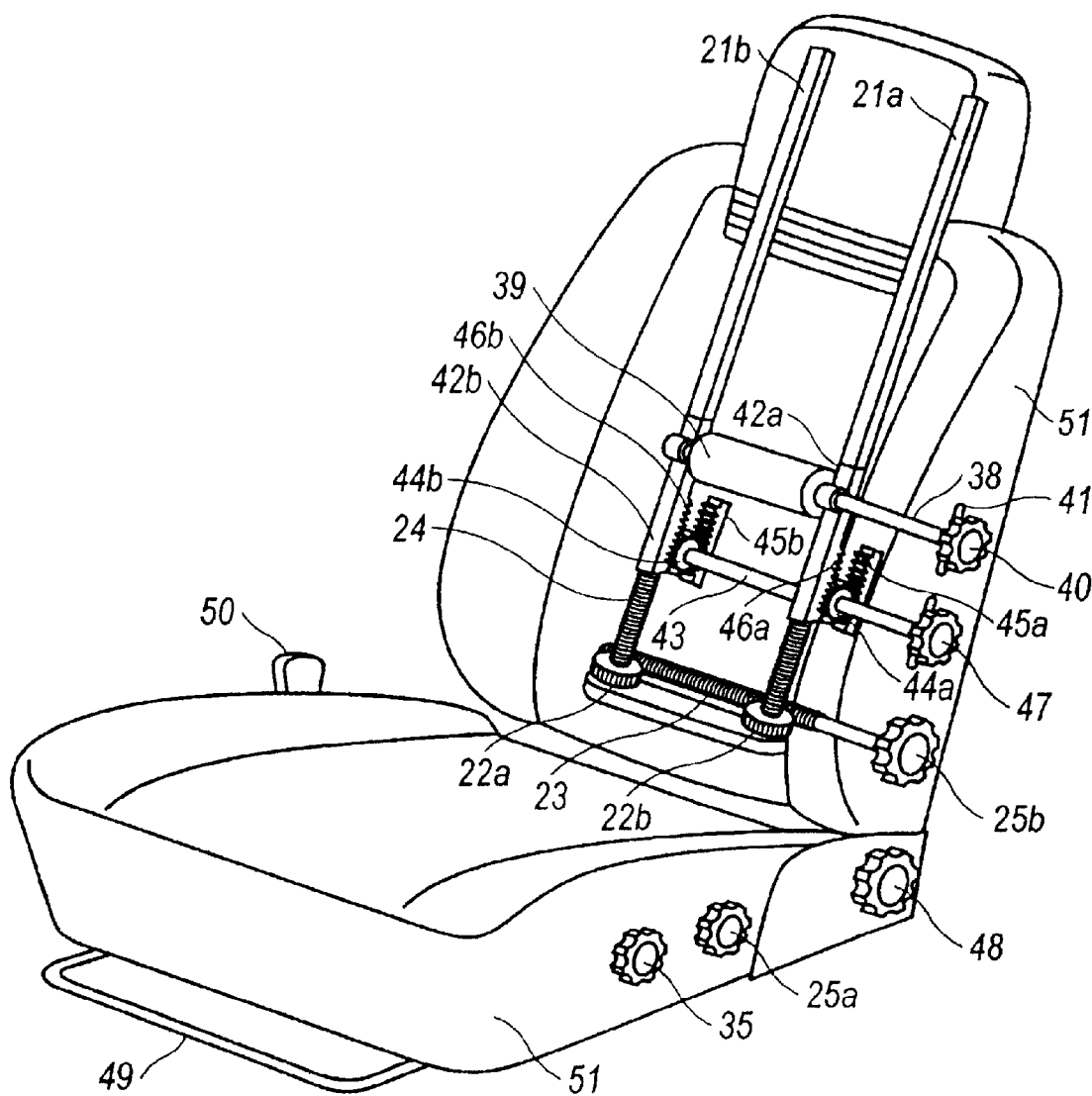
FIG. 3 shows a partial cut-away view of a chair with mechanisms for adjustment of the back.

For adjustment of the length of the seat and the height of the back, and thus the height of the head rest, the rear section of the frame, according to FIG. 3, is provided with at least two attachment guides which are arranged in pairs. These guides 20a, 20,b, 21a, 21b are mounted in the attachments and run in the longitudinal direction of the frames, wherein they are fixedly or pivotally mounted in the external edge sections 3, 4 of the frame at the front part of the seat and the upper part of the head rest, respectively. The guides are provided with a respective first gear wheel 22a–b which are connected with a transversal axle 23 with corresponding second gear wheel, which transversal axle 23 is mounted in the opposite external edge sections 3, 4 of the frame. Of course, the gear wheel can be replaced by drive gears, gear belts or any other type of suitable mechanism for movement transmission.

The axial displacement of the guides is provided by way of a fixed or rotatable screw 24; for example, a feed control which cooperates with an internal thread in the end of each guide. The first gear wheel can be attached directly to each guide, wherein the screw is fixed. If the first gear wheel is mounted on the screw, this is rotated in the guide which only is displaced axially.

Adjustment can be achieved by connecting an electric motor directly to one of the gear wheels of the guides. Alternatively, the adjustment is achieved by acting manually upon a control 25a–b which is situated on one side of the seat and the back, respectively, which control is connected with said transversal axle. The electric motor for adjustment can also be connected to the gear wheels of the guides via a toothed wheel gearing or via a belt.

Alternatively, an electric motor 26 can be mounted on the rear section of the frame in direct connection with the resilient sections 7, 8, wherein adjustment occurs via a feed control which is connected with the external section of the frame. In this regard, the rear section and the adjustable section can also be connected with a spring 27, which cooperates with the resilient sections for return to unloaded position.

Figure 4A:
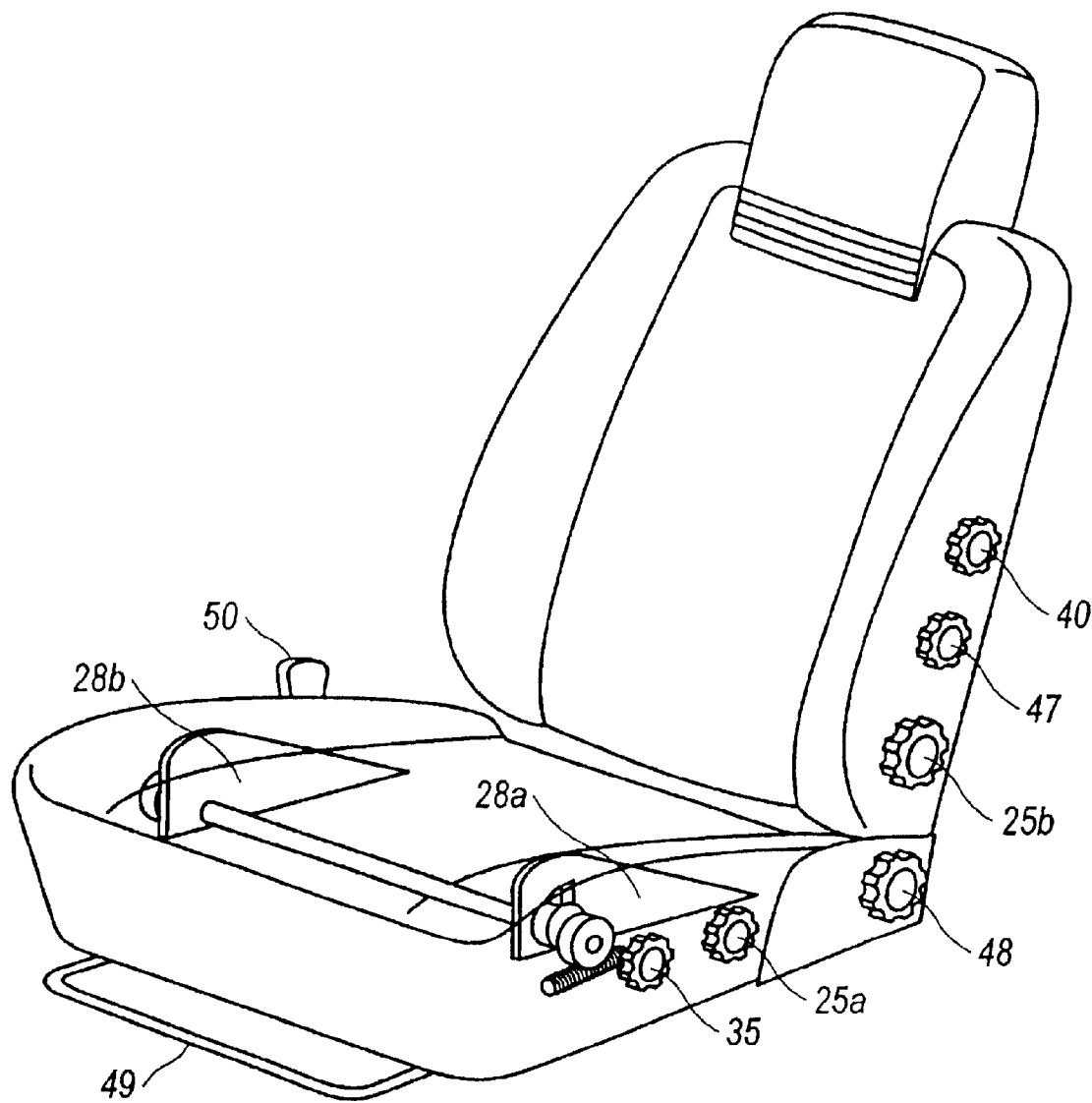
FIG. 4a shows a partial cut-away view of a chair with mechanisms for adjustment of side supports.

As is apparent from FIG. 4a, the chair is provided with side supports 28a, 28b, 29a, 29b for the seat as well as the back. The side supports are formed in one piece of a suitable plastics material, such as glass fibre armored polyamide, a thermoplastic elastomer, or the like; the properties of which provide that it can be designed as a hinge. One section 30a of the support is attached to the outside of the external edge section of the frame and comprises a pivoted section which is connected with a second section 30b which can be attached to, alternatively situated inside the stuffing 51 of the chair, in the part that forms the side edges of the chair and shall provide lateral support for the legs and the back, respectively. An advantageous embodiment comprises the use of side supports with identical form for the seat as well as the back rest. The side support is inserted into the stuffing 51 from below, wherein the edge section 30a of the first section and the pivoted section are attached to the frame.

Alternatively, the side support can be inserted into the stuffing 51 from the inside, wherein the pivoted section and edge section 30a are constituted by two or more tongues which protrude through recesses in the stuffing 51 and are attached to the frame.

Figure 4B:
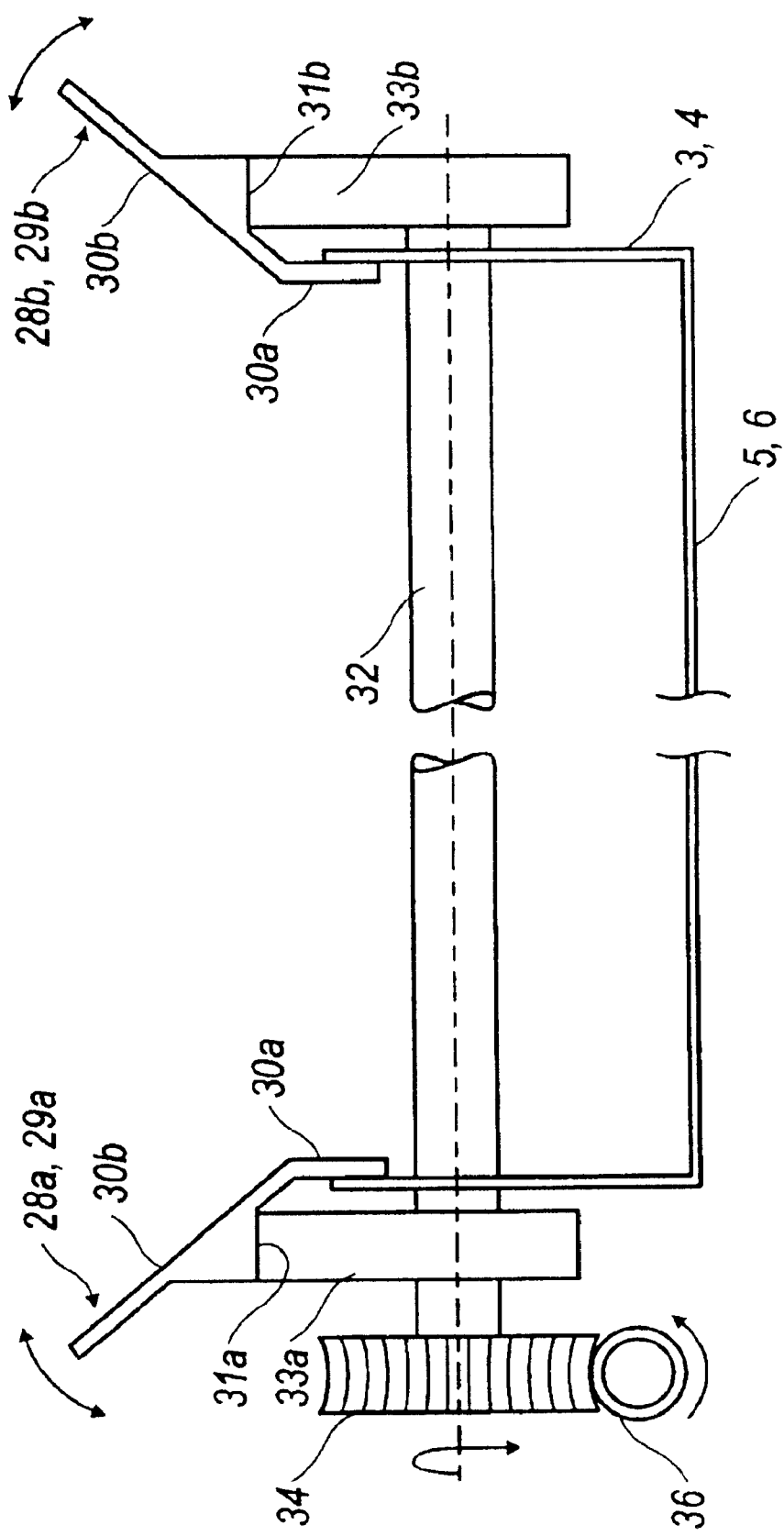
FIG. 4b shows, in detail, an exemplary mechanism for adjustment of side supports of a chair.

The part of the side support which is to be adjusted is suitably provided with a plane horizontal surface 31a–b or edge on its underside as shown in FIG. 4b. A transversal axle 32 which is mounted in the edge sections of the frame is provided with a pair of cams 33a–b, the radius of which varies in relation to the centre line of the axle. The cams bear against said plane surfaces or edges 31a–b. By turning the axle 32, the angle of the support can be set. The turning mechanism can be formed as gear wheel 34 which is attached to the end of the axle and is acted upon by means of a knob 35 via a worm gear 36.

The knob of the turning mechanism can also act upon the gear wheel via an angle gear or a rack. It is also possible to act upon the axle by means of an electric motor 37 via a toothed wheel gearing or a gear belt.

In those cases where the side supports are identical for both the seat and the back rest, it is suitable to use similar mechanisms for adjustment of the side supports.

The back of the chair is provided with an adjustable lumbar support, which can be provided with a rotatable through axle 38, the ends of which are fixedly mounted on, or alternatively slidingly attached to the external edge sections of the frame. The axle is provided with one or more elements in the form of cams 39, the radius of which varies in relation to the centerline of the axle. Thus, by turning the axle, the lumbar support can move outwards or inwards in relation to rear section of the frame. The turning can be provided either by means of a knob 40 on the end of the axle or by means of an electric motor via a toothed wheel gearing or a gear belt.

In an alternate embodiment, the ends of the first axle are situated in grooves 41 which run along the external edge sections of the frame and are mounted in a pair of profiles 42a, 42b which are slidingly connected with or around the guides 21a, 21b which affect the height of the head rest. The profiles can be kept in its set height by means of irreversibility in the mechanism, friction, spring-load or similar. A second axle 43 is provided with a pair of gear wheels 44a, 44b which are situated in engagement between tooth rows 46a, 46b on the respective profile 42a, 42b and a pair of corresponding racks 45a, 45b which are attached to or integrated with the rear section 6 of the frame. Therefore, it is possible to manually adjust the vertical height of the lumbar support in relation to the back rest via a knob 47 which acts upon the axle 43.

Because the adjustment mechanism for the lumbar support is connected with the mechanism for adjustment of the head rest, it is possible to obtain a completely automatic adjustment of both functions. A suitable proportional relative movement can be obtained by moving the lumbar support half the distance that the head rest is adjusted. This is adjusted by selection of a suitable tooth contour and tooth pitch. For simultaneous movement of the lumbar support and the head rest, the knob 25b is used. Of course, it should be appreciated that it is possible to replace the manual knobs with electric motors.

For adjustment of the height or the inclination of the seat and the longitudinal adjustment of the entire chair, existing standard mechanisms 48–50 can be utilized. Adjustment of the frame is only necessary for cooperation with said mechanisms and these will therefore not be described more in detail in this application.

A standard material is used for stuffing 51 in the seat and the back; for example, an expanded plastic foam or similar material. In order to provide a certain expansion or compression in connection with adjustment of the length of the seat or the height of the back, the stuffing 51 utilized at the resilient sections is provided with a number of recesses. These recesses can be through, but are preferably made from the underside or the backside of the stuffing 51 without going through the material completely. The recesses are preferably made during manufacture of the expanded product and can be provided with a cross-section of optional geometrical form; that is, triangular, quadrangular, round, and the like. The location of the recesses in connection with the resilient sections can be both regular or irregular and the number is selected with regard to the rigidity in the stuffing 51 in question. The more rigid the stuffing 51, the more recesses are required in order to avoid creases or deformation of the upholstery, seams, cloth patterns, and the like, this design can be adapted regarding the location of the recesses.

It should be appreciated that invention is not limited to the embodiment which is described above, but may be varied within the scope of the appended claims. For example, the invention can be utilized in connection with various types of vehicles in addition to passenger cars, such as in trucks, buses and the like.

What is claimed and desired to be secured by Letters Patent is as follows:

1. A chair for vehicles, said chair comprising:
   a seat part and a back part, each of said parts being adapted to have several adjustment possibilities for individual adaptation of the chair regarding length, height, side and lumbar support; and
   an internal frame construction forming a portion of at least one of the seat or back parts, said frame construction including a front and a rear edge section and two opposite side edge sections, each of said side edge section being formed in one piece and being connected with the rear edge section, wherein opposing sections of said side edge sections of the frame are provided with one or more elastic, longitudinally adjustable sections, and the rear edge section is provided with one or more interruptions between opposing longitudinally adjustable sections that facilitate the frame construction being adjustable in a longitudinal direction by elastic deformation of said adjustable sections.

2. The chair for vehicles as recited in claim 1, wherein the longitudinally adjustable sections of the side edge sections have sinusoidal or trapezoidal cross-sections.

3. The chair for vehicles as recited in claim 1, wherein the frame construction further comprises an integrally injection molded part of a thermoplastic material.

4. The chair for vehicles as recited in claim 1, wherein the adjustable sections of the frame can be adjusted approximately +/−30 mm.

5. The chair for vehicles as recited in claim 1, wherein the side edge sections of the frame are provided with reinforcement plates from a point where the seat part and the back part meet to the point where the longitudinally adjustable sections begin.

6. The chair for vehicles as recited in claim 1, wherein the frame has integrated attachments for manual as well as electrical operating units and reinforcements for mounting of side collision protections.

7. The chair for vehicles as recited in claim 6, wherein the longitudinally adjustable sections of the frame form part of a back rest and constitutes a vertically adjustable head rest.

8. The chair for vehicles as recited in claim 6, wherein the longitudinally adjustable part of the frame forms part of a chair seat and constitutes a longitudinally adjustable front section thereof.

9. The chair for vehicles as recited in claim 6, wherein the frame is provided with mounting points for a pivotable axle for a lumbar support.

10. The chair for vehicles as recited in claim 9, wherein the vertical adjustment of the lumbar support is mechanically connected to the vertical adjustment of a head rest.

11. The chair for vehicles as recited in claim 10, wherein the vertical movement of the lumbar support is approximately half the distance which the head rest is adjusted.

12. The chair for vehicles as recited in claim 6, wherein the edge sections of the frame have mounting points for side supports for legs and back, respectively.

13. The chair for vehicles as recited in claim 12, wherein the side supports are formed in one piece and includes a first section which has a hinge section that is configured to be fastened to the frame, and a second section is adapted to be angled in relation to the frame.

14. The chair for vehicles as recited in claim 13, wherein the side supports are angled by a rotatable cam that acts upon an edge on the underside of the second section.

15. The chair for vehicles as recited in claim 12, wherein the side supports are identically designed for both seat part and back part.

16. The chair for vehicles as recited in claim 6, wherein the frame is provided with stuffing that in a section between the longitudinally adjustable sections has several recesses that originate from the back side of the stuffing and which accommodate expansion and compression of the stuffing during longitudinal adjustment of the sections.

17. The chair for vehicles as recited in claim 16, wherein the recesses are provided with a geometrical form chosen from the group comprising circular and triangular shapes.

18. The chair for vehicles as recited in claim 6, wherein the frame in the front adjustable part of the seat part is provided with a transversal reinforcement configured to prevent submarining in the event of a collision.

19. The chair for vehicles as recited in claim 18, wherein the transversal reinforcement has a central recess on an upper side thereof.

* * * * *